(12) United States Patent
Hamza et al.

(10) Patent No.: US 12,167,033 B2
(45) Date of Patent: Dec. 10, 2024

(54) VIDEO-BASED POINT CLOUD STREAMS

(71) Applicant: VID SCALE, INC., Wilmington, DE (US)

(72) Inventors: Ahmed Hamza, Montreal (CA); Yong He, San Diego, CA (US)

(73) Assignee: InterDigital VC Holdings, Inc., Wilmington, DE (US)

( * ) Notice: Subject to any disclaimer, the term of this patent is extended or adjusted under 35 U.S.C. 154(b) by 224 days.

(21) Appl. No.: 17/613,634

(22) PCT Filed: May 21, 2020

(86) PCT No.: PCT/US2020/034035
§ 371 (c)(1),
(2) Date: Nov. 23, 2021

(87) PCT Pub. No.: WO2020/237072
PCT Pub. Date: Nov. 26, 2020

(65) Prior Publication Data
US 2022/0239947 A1 Jul. 28, 2022

Related U.S. Application Data

(60) Provisional application No. 62/852,046, filed on May 23, 2019, provisional application No. 62/907,249, filed on Sep. 27, 2019.

(51) Int. Cl.
*H04N 19/597* (2014.01)
*H04N 19/132* (2014.01)
(Continued)

(52) U.S. Cl.
CPC ......... *H04N 19/597* (2014.11); *H04N 19/132* (2014.11); *H04N 19/176* (2014.11); *H04N 19/188* (2014.11)

(58) Field of Classification Search
CPC .. H04N 19/597; H04N 19/132; H04N 19/176; H04N 19/188
(Continued)

(56) References Cited

U.S. PATENT DOCUMENTS 10,291,923 B2 5/2019 Hendry et al.
11,032,571 B2 6/2021 Song et al.
(Continued)

FOREIGN PATENT DOCUMENTS

CN 108731693 A 11/2018
CN 108886642 A 11/2018
(Continued)

OTHER PUBLICATIONS

Aksu, Emre B., "Technologies Under Consideration for Carriage of Point Cloud Data", Systems, ISO/IEC JTC1/SC29/WG11 MPEG2018/N18414, Geneva, CH, Mar. 2019, 38 pages.
(Continued)

*Primary Examiner* — Dominic D Saltarelli
(74) *Attorney, Agent, or Firm* — Condo Roccia Koptiw LLP

(57) ABSTRACT

Systems, methods, and instrumentalities are disclosed herein that related to video-based point cloud streams in one or more ISO Base Media File Format (ISOBMFF) container files. A container format for point cloud data is provided and the container format indicates at least a relationship between a 3D region of the point cloud and one or more video-based point cloud compression (V-PCC) tracks. The V-PCC tracks may be grouped together and linked to the 3D region to allow spatial access to the 3D region.

20 Claims, 9 Drawing Sheets

(51) Int. Cl.
*H04N 19/169* (2014.01)
*H04N 19/176* (2014.01)

(58) Field of Classification Search
USPC .................................................. 375/240.12
See application file for complete search history.

(56) References Cited

U.S. PATENT DOCUMENTS

| | | | |
|---|---|---|---|
| 11,178,377 | B2 | 11/2021 | Wang et al. |
| 11,297,346 | B2 | 4/2022 | Chou et al. |
| 11,463,681 | B2 * | 10/2022 | Aflaki Beni ......... H04N 13/344 |
| 2010/0153395 | A1 | 6/2010 | Wang et al. |
| 2015/0172692 | A1 | 6/2015 | Yang et al. |
| 2017/0289556 | A1 * | 10/2017 | Hendry ............ H04N 21/85406 |
| 2018/0020204 | A1 * | 1/2018 | Pang .................... H04N 23/90 |
| 2018/0103271 | A1 | 4/2018 | Wang et al. |
| 2018/0160123 | A1 | 6/2018 | Van Der Auwera et al. |
| 2018/0376152 | A1 | 12/2018 | Wang et al. |
| 2019/0139266 | A1 | 5/2019 | Budagavi et al. |
| 2019/0141311 | A1 | 5/2019 | Lee et al. |
| 2019/0174150 | A1 | 6/2019 | D'acunto et al. |
| 2020/0105063 | A1 | 4/2020 | Wang et al. |
| 2020/0153885 | A1 | 5/2020 | Lee et al. |
| 2021/0005016 | A1 | 1/2021 | Oh |
| 2021/0295568 | A1 | 9/2021 | Li et al. |
| 2022/0141487 | A1 | 5/2022 | Oh |
| 2022/0159261 | A1 | 5/2022 | Oh |

FOREIGN PATENT DOCUMENTS

| | | |
|---|---|---|
| CN | 109076255 A | 12/2018 |
| CN | 109155860 A | 1/2019 |
| CN | 109196559 A | 1/2019 |
| CN | 109257587 A | 1/2019 |
| CN | 109327699 A | 2/2019 |
| CN | 109792567 A | 5/2019 |
| CN | 109979008 A | 7/2019 |
| CN | 108827317 B | 5/2022 |
| EP | 3 474 562 A1 | 4/2019 |
| JP | 2015-534376 A | 11/2015 |
| JP | 2019-526178 A | 9/2019 |
| JP | 2020-501436 A | 1/2020 |
| TW | 201009701 A | 3/2010 |
| TW | 201841510 A | 11/2018 |
| TW | 201907720 A | 2/2019 |
| WO | 2017/202899 A1 | 11/2017 |
| WO | 2018/106548 A1 | 6/2018 |
| WO | 2019/013430 A1 | 1/2019 |

OTHER PUBLICATIONS

Hamza et al., "[PCC Systems] On Playout Groups for V-PCC Components", InterDigital Communications, Inc., ISO/IEC JTC1/SC29/WG11 m52256, Brussels, BE, Jan. 2020, 2 pages.

Hamza et al., "[VPCC] On Carriage of V-PCC in ISOBMFF", InterDigital Communications, Inc., ISO/IEC JTC1/SC9/WG11 m47438, Geneva, Switzerland, Mar. 2019, 5 pages.

Hamza et al., "Supporting V-PCC Tile Groups and Spatial Access in MPEG-I Part 10", InterDigital Communications, Inc., ISO/IEC JTC1/SC29/WG11 m49107, Gothenburg, SE, Jul. 2019, 5 pages.

ISO/IEC, "Continous Improvement of Study Text of ISO/IEC CD 23090-5 Video-Based Point Cloud Compression", 3DG, ISO/IEC JTC 1/SC 29/WG 11 N18479, Coding of Moving Pictures and Audio Convenorship: UNI (Italy), May 8, 2019, 140 pages.

ISO/IEC, "Information Technology—Coding of Audio-Visual Objects—Part 12: ISO Base Media File Format", ISO/IEC 14496-12:2015(E), Dec. 15, 2015, 248 pages.

ISO/IEC, "Text of ISO/IEC CD 23090-10 Carriage of PC Data", Systems, ISO/IEC JTC 1/SC 29/WG 11 N18606, Coding of Moving Pictures and Audio Convenorship: UNI (Italy), Aug. 23, 2019, 21 pages.

Jang et al., "Video-Based Point-Cloud-Compression Standard in MPEG: From Evidence Collection to Committee Draft", IEEE Signal Processing Magazine, May 2019, pp. 118-123.

Kondrad et al., "Playout Group", Nokia Technologies, ISCO/IEC JTC1/SC29/WG11 MPEG2018/m50824, Geneva, Switzerland, Oct. 2019, 3 pages.

Oh, Sejin, "On V-PCC Grouping and V-PCC Track", LG Electronics Inc., ISO 23090-10:2019(E), ISO/IEC JTC1/SC29/WG11 MPEG2017/m48114, Gothenburg, Sweden, Sep. 2019, 6 pages.

Schwarz et al., "Emerging MPEG Standards for Point Cloud Compression", IEEE Journal on Emerging and Selected Topics in Circuits and Systems, vol. 9, No. 1, Mar. 2019, pp. 133-148.

Tourapis et al., "Video-Based Point Cloud Coding High Level Syntax: Updates and Unification with the Working Draft on Metadata for Immersive Video", Apple Inc., ISO/IEC JTC1/SC29/WG11 MPEG2019/m49590 Gothenburg, SE, Jul. 2019, 10 pages.

Wang et al., "On Spatial Grouping of V-PCC Patch Tracks", MediaTek USA, Inc., ISO/IEC JTC1/SC29/WG11 MPEG2019/m48110, Gothenburg, SE, Jul. 2019, 10 pages.

ISO/IEC "WD of ISO/IEC 23090-10 Carriage of PC Data", N18321, MPEG 126, Mar. 2019, 16 pages.

ISO/IEC, "Use Cases for Point Cloud Compression (PCC)", ISO/IEC JTC1/SC29/WG11 MPEG2015/ N16331, Geneva, CH, Jun. 2016, 8 pages.

ISO/IEC, "Wd 4 of ISO/IEC 23090-2 OMAF 2nd Edition", Systems, ISO/IEC JTC1/SC29/WG11 N18227-V1, Marrakech, MA, Jan. 2019, 227 pages.

ISO/IEC, "WD of ISO/IEC 23090-10 Carriage of PC Data", Systems, ISO/IEC JTC 1/SC 29/WG 11 N18321, Coding of Moving Pictures and Audio Convenorship: UNI (Italy), Apr. 12, 2019, 16 pages.

ISO/IEC, "Technologies Under Consideration on Carriage of Point Cloud Data", MPEG Meeting 126, Motion Picture Expert Group or ISO/IEC JTC1/SC29/WG11, N18414, Geneva, Mar. 25-29, 2019, 38 pages.

Xie et al., "An Organization Method of Vehicle-borne Massive Point Cloud Data Using Tile Indexing", Bulletin of Surveying and Mapping, Mar. 2017, 6 pages.

ISO/IEC, "Technologies Under Consideration for Carriage of Point Cloud Data", ISO/IEC JTC 1/SC 29/WG 11, N18414, Geneva, CH, Mar. 2019, 40 pages.

* cited by examiner

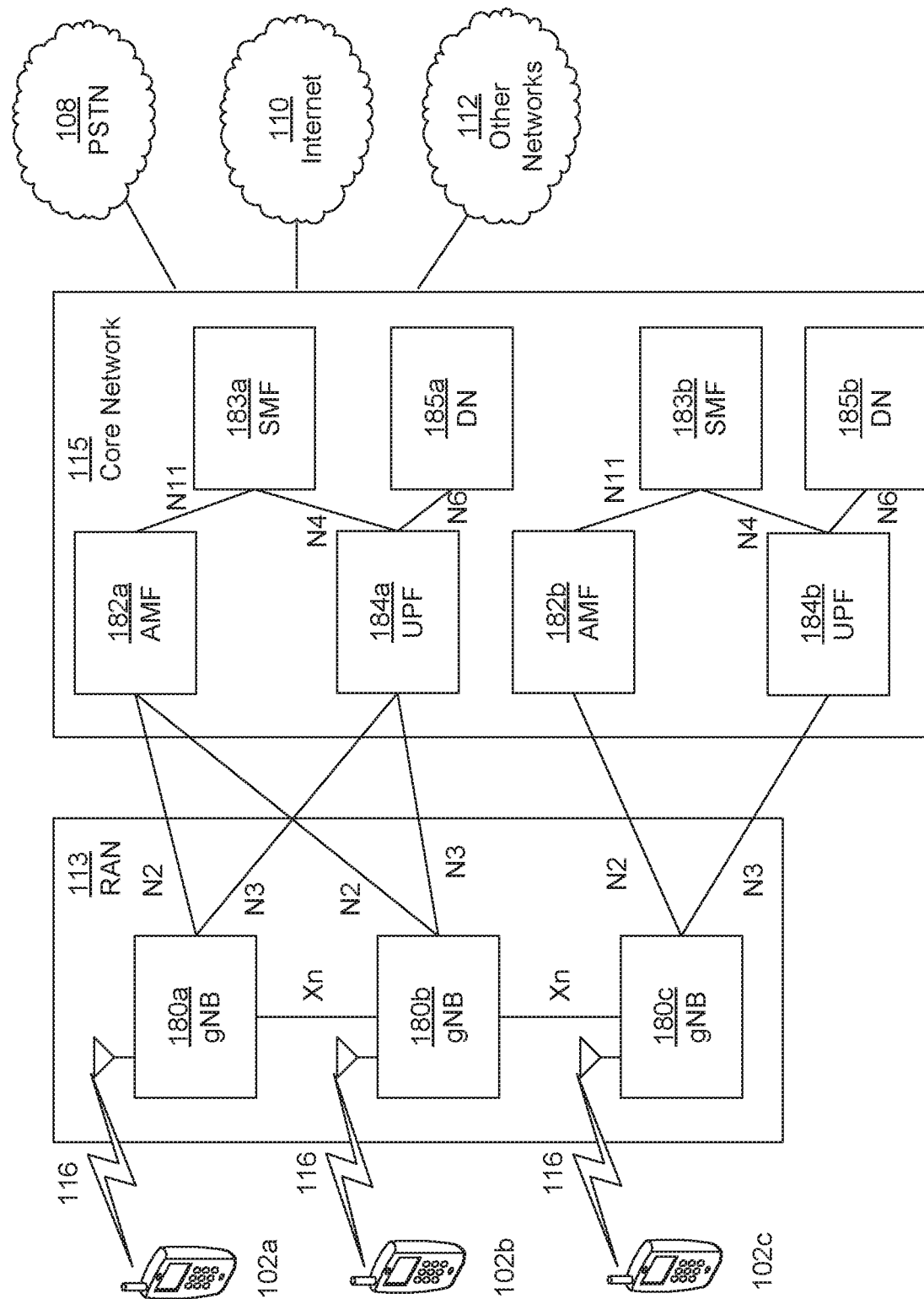

VIDEO-BASED POINT CLOUD STREAMS

CROSS-REFERENCE TO RELATED APPLICATIONS

This application is the National Stage Entry under 35 U.S.C. § 371 of Patent Cooperation Treaty Application No. PCT/US2020/034035, filed May 21, 2020, which claims the benefit of U.S. Provisional Application No. 62/852,046 filed on May 23, 2019, and U.S. Provisional Application No. 62/907,249 filed on Sep. 27, 2019, the disclosures of which are incorporated by referenced herein in their entireties.

BACKGROUND

Video coding systems may be used to compress and/or decompress digital video signals, e.g., to reduce the storage and/or transmission bandwidth needed for such signals. Three-dimensional (3D) point clouds have emerged as an advanced representation of immersive media. These point clouds may be captured in a number of ways using, for example, multiple cameras, depth sensors, and/or light detection and ranging (LiDAR) laser scanners. The number of points needed to realistically reconstruct objects and/or scenes in a 3D space may be in the order of millions or billions. As such, efficient representation, compression and/or delivery techniques are desirable for storing and/or transmitting point cloud data.

SUMMARY

Systems, methods, and instrumentalities are disclosed for processing video data associated with a three-dimensional (3D) space. A video decoding device as described herein may comprise a processor configured to receive a media container file (e.g., an International Organization for Standardization (ISO) Base Media File Format (ISOBMFF) container file) that includes a video-based point cloud compression (V-PCC) bitstream. The processor may parse the media container file and/or the V-PCC bitstream included therein to determine a region identifier (ID) of a 3D region in the 3D space and respective track group IDs of one or more track groups associated with the 3D space. The processor may determine that the one or more track groups are associated with the 3D region based on a determination that the respective track group IDs of the one or more track groups are linked to the region ID of the 3D region. The processor may decode video tracks (e.g., corresponding to one or more tiles in a 2D frame) belonging to the one or more track groups to render a visual representation of the 3D region of the 3D space. The one or more track groups described herein may share a common track group type and the one or more track groups may be determined to be associated with the 3D region based further on the track group type. The medial container file may comprise one or more structures defining a number of regions associated with the 3D space and a number of track groups associated with each of the regions, and the processor may be configured to determine that the respective track group IDs of the one or more track groups are linked to the region ID of the 3D region based on information comprised in the structure.

The medial container file may comprise timed metadata that include information associated with a subset of the regions that have been updated and the timed metadata may indicate the updates (e.g., position, dimensions, etc.) to the subset of the regions. Further, the video tracks may comprise one or more sample entries and each of the one or more sample entries may comprise an indication of a length of a data field that indicates a network abstraction layer (NAL) unit size. The sample entry may further comprise an indication of a number of V-PCC parameter sets associated with the sample entry or a number of arrays of atlas NAL units associated with the sample entry.

BRIEF DESCRIPTION OF THE DRAWINGS

FIG. 1D is a system diagram illustrating a further example RAN and a further example CN that may be used within the communications system illustrated in FIG. 1A according to an embodiment.

FIG. 4 illustrates an example constraint where the intra-random access point (IRAP) samples of the components is aligned.

FIG. 5 illustrates an example of using a least common multiple of IRAP periods to indicate a V-PCC IRAP.

DETAILED DESCRIPTION

A more detailed understanding may be had from the following description, given by way of example in conjunction with the accompanying drawings.

Figure 1A:
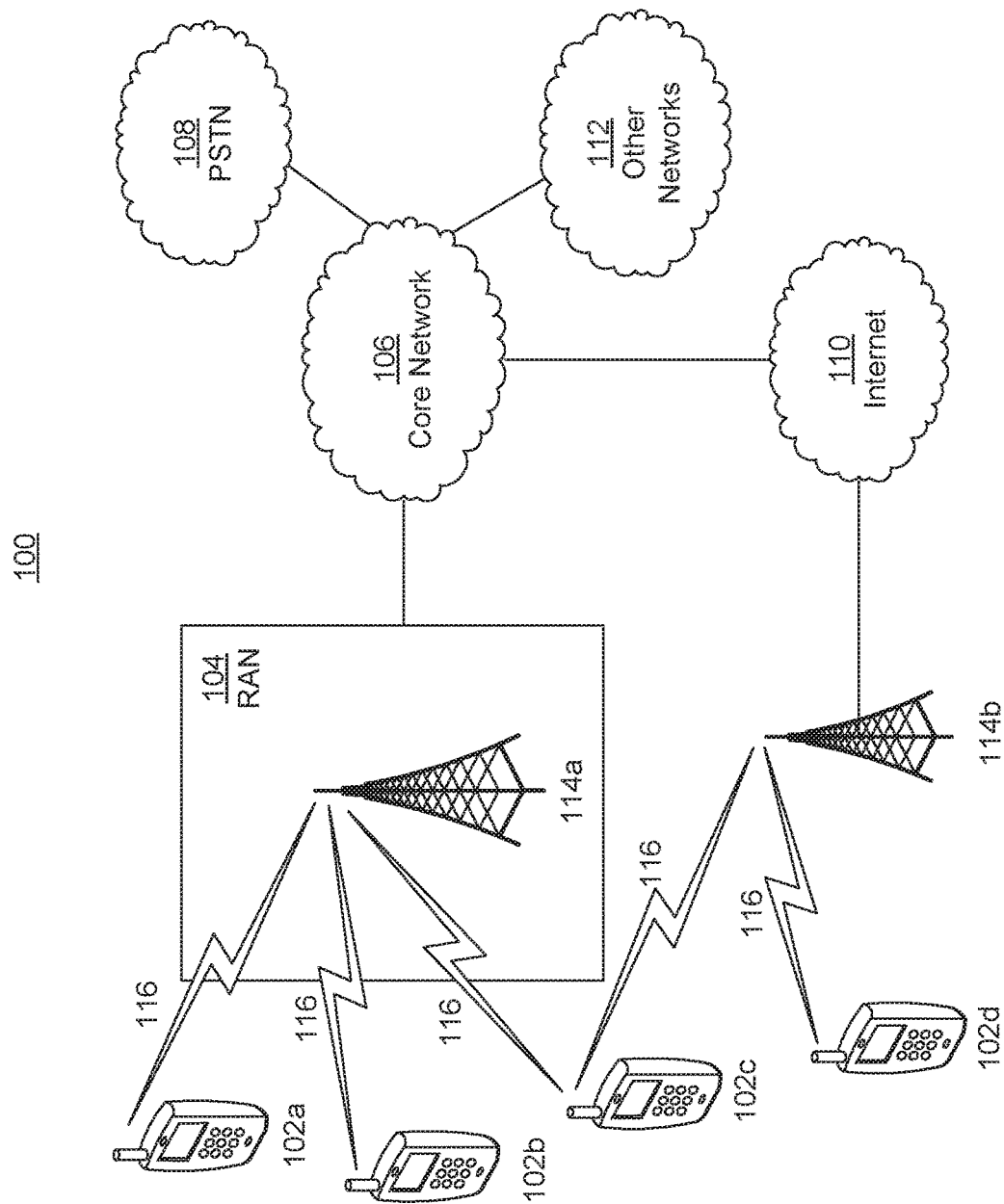
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like.

For example, the base station 114a in the RAN 1041113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication, Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
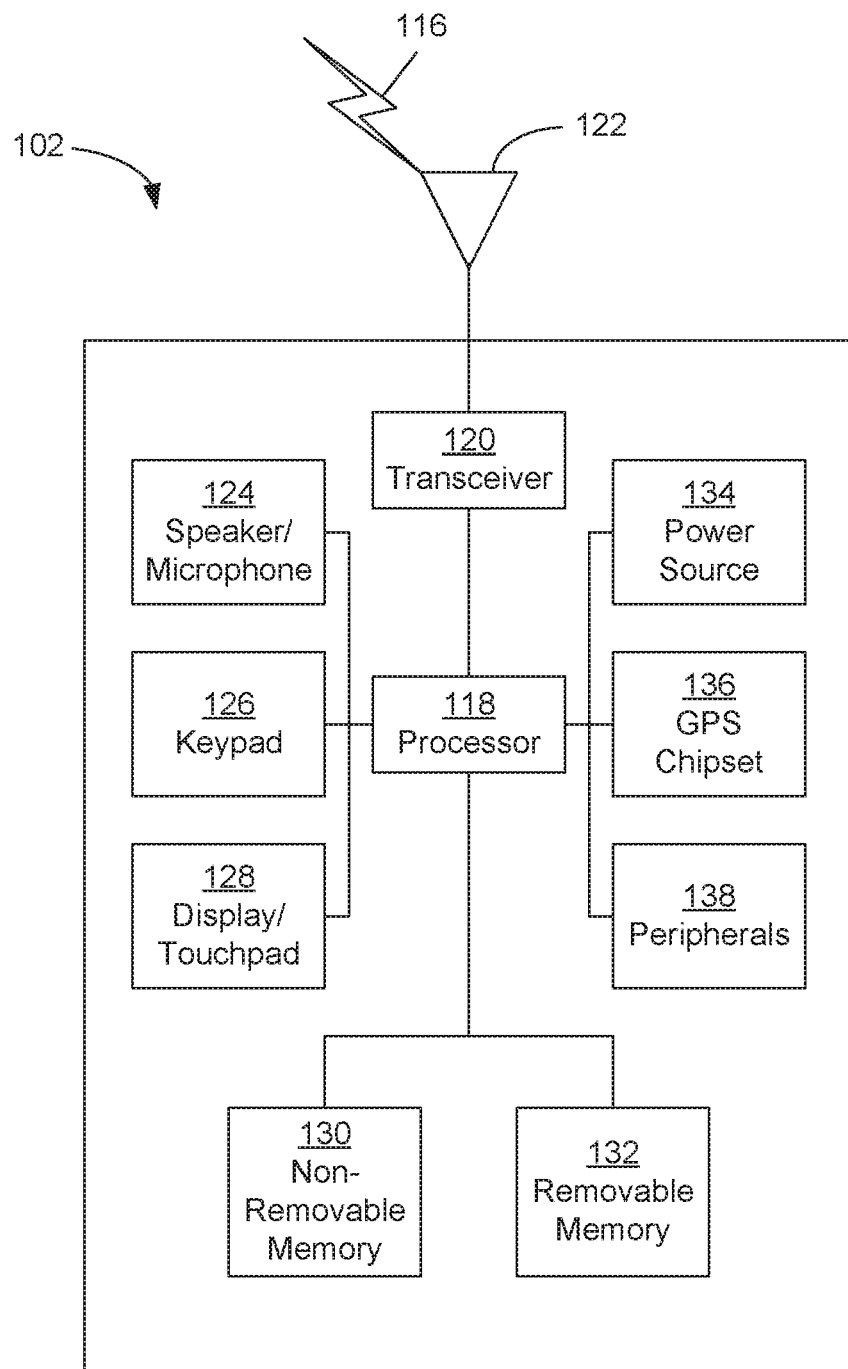
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, alight sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
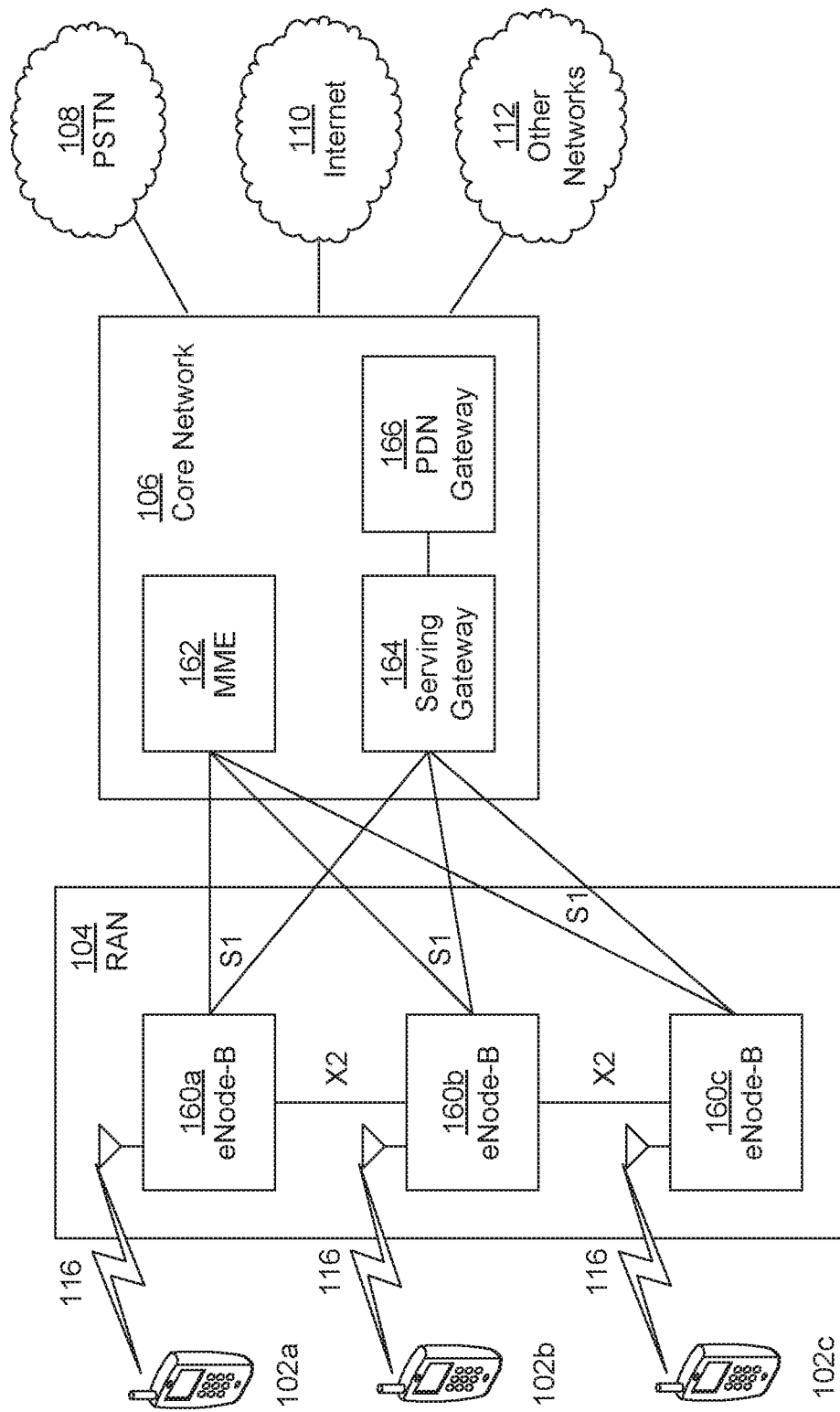
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an 'ad-hoc' mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area, MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carder sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment Direct RF coupling and/or wireless communications via RF circuitry (e.g., which may include one or more antennas) may be used by the emulation devices to transmit and/or receive data.

3D point clouds (e.g., high-quality 3D point clouds) may be used to represent immersive media. A point cloud may include one or more (e.g., a set of) points that may be represented in a 3D space using coordinates indicating the location of each point and/or one or more attributes. For example, the attributes may include one or more of the following: the color associated with each point, transparency, time of acquisition, reflectance of laser or material property, etc. A point cloud may be captured in a number of ways. For example, multiple cameras and depth sensors may be used to capture point clouds. Light detection and ranging (LiDAR) laser scanners may be used to capture point clouds. The number of points comprised in point clouds for realistically reconstructing objects and/or scenes in a 3D space may be in the order of millions or billions. Efficient representation and compression may facilitate storing and/or transmitting point cloud data.

Figure 2:
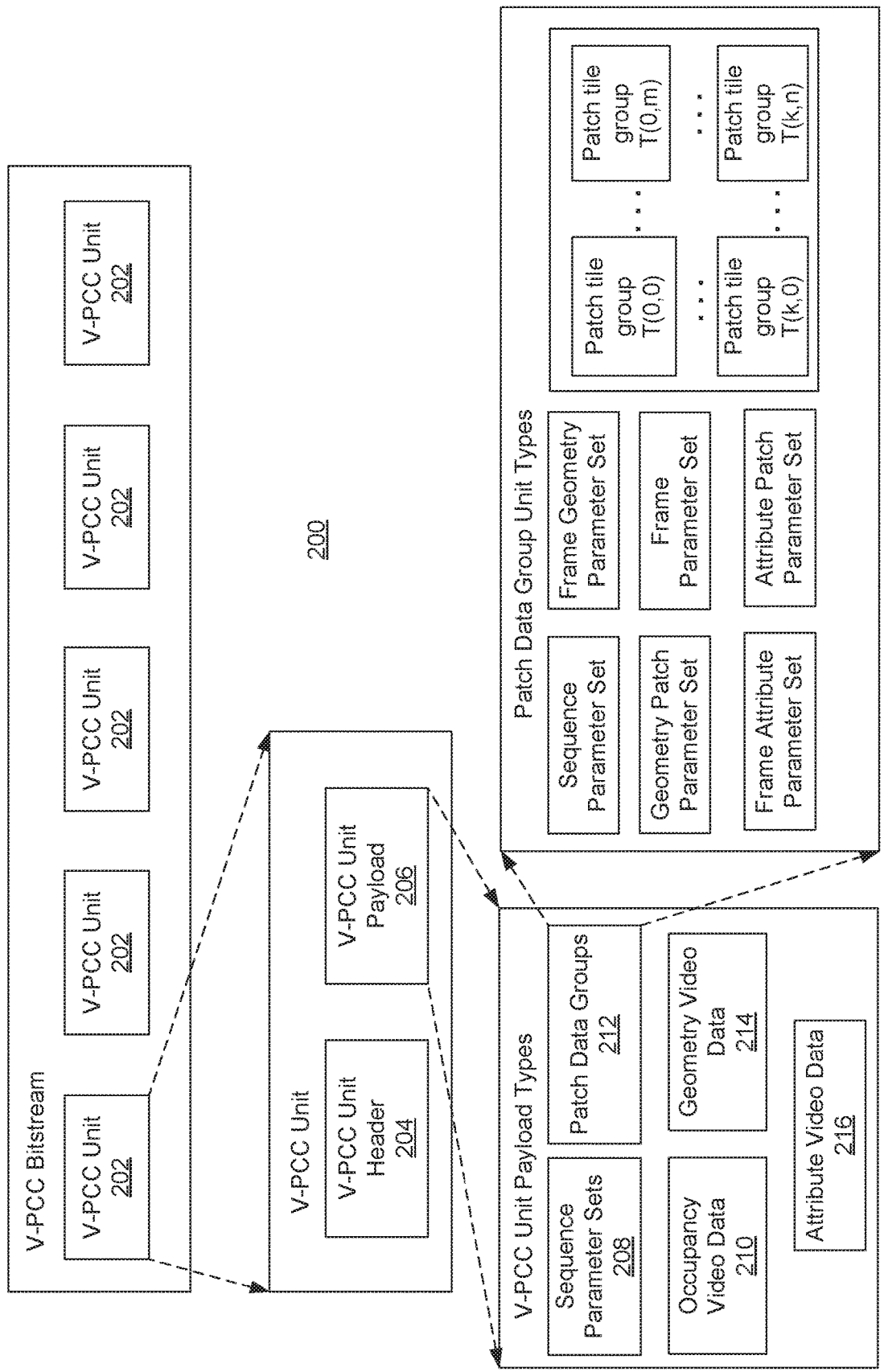
FIG. 2 illustrates an example video-based point cloud compression (V-PCC) bitstream structure that includes a plurality of V-PCC units.

FIG. 2 illustrates an example structure of a bitstream 200 for video-based point cloud compression (V-PCC) that may be transmitted (e.g., signaled) by an encoding device, and parsed and decoded by a decoding device. The V-PCC bitstream 200 may include a set of one or more V-PCC units 202 and Table 1 includes an example syntax for signaling the V-PCC units. Each V-PCC unit 202 may include a V-PCC unit header 204 and a V-PCC unit payload 206, and the V-PCC unit payload 206 may in turn include one or more of sequence parameter sets 208, occupancy vide data 210, patch data groups 212 of various types, geometry video data 214, or attribute video data 216. The V-PCC unit header 204 may define the V-PCC unit type (e.g., as indicated by the vpcc_unit_type field in Table 2) of the V-PCC unit, which may be one of a plurality of values including, for example, VPCC_OVD, VPCC_GVD and VPCC_AVD, VPCC_PDG, VPCC_SPS that may correspond to occupancy, geometry, attribute, patch data group, and sequence parameter set data units, respectively. V-PCC units of some or all of these unit types may be used to reconstruct a point cloud. A V-PCC attribute unit header may specify an attribute type and its index. The V-PCC attribute unit header may allow multiple instances of the same attribute type to be supported. As shown, vpcc_unit_type may indicate a type of the V-PCC unit vpcc_sequence_parameter_set_id may indicate an identifier of a V-PCC sequence parameter set, vpcc_attribute_index may indicate an index for V-PCC attribute, vpcc_attribute_dimension_index may indicate an index for dimension partition of the V-PCC attribute, sps_multiple_layer_streams_present_flag may indicate whether a sequence parameter set (SPS) is associated with multiple layers or views, vpcc_layer_index may indicate an index for one of the multiple layers, pcm_separate_video_data may indicate pulse code modulation (PCM) video data (e.g., in a separate video stream) and/or parameters associated with coding the PCM data, and vpcc_reserved_zero_23 bits or vpcc_reserved_zero_27 bits may indicate the number of reserved zero bits.

The payload of occupancy, geometry, and/or attribute V-PCC units may correspond to video data units (e.g., HEVC network abstraction layer (NAL) units) that could be decoded by a video decoding device (e.g., as specified in the corresponding occupancy, geometry, and attribute parameter set V-PCC unit(s)). Table 3 illustrates an example V-PCC unit payload syntax.

TABLE 1

| V-PCC unit syntax | |
|---|---|
| | Descriptor |
| vpcc_unit( ) {<br>  vpcc_unit_header( )<br>  vpcc_unit_payload( )<br>} | |

TABLE 2

| V-PCC unit header syntax | |
|---|---|
| | Descriptor |
| vpcc_unitheader( ) { | |
|   vpcc_unit_type | u(5) |
|   if( vpcc_unit_type = = VPCC_AVD \|\| vpcc_unittype = = VPCC_GVD \|\|<br>    vpcc_unit_type = = VPCC_OVD \|\| vpcc_unit_type = = VPCC_PDG ) | |
|     vpcc_sequence_parameter_set_id | u(4) |
|   if( vpcc_unit_type = = VPCC_AVD ) { | |
|     vpcc_attribute_index | u(7) |
|     vpcc_attribute_dimension_index | u(7) |
|     if( sps_multiple_layer_streams_present_flag ) { | |
|       vpcc_layer_index | u(4) |
|       pcm_separate_video_data( 4 ) | |
|     } | |
|     else | |
|       pcm_separate_video_data( 8 ) | |
|   } else if( vpcc_unit_type = = VPCC_GVD ) { | |
|     if( sps_multiple_layer_streams_present_flag ) { | |
|       vpcc_layer_index | u(4) |
|       pcm_separate_video_data( 18 ) | |
|     } | |
|     else | |
|       pcm_separate_video_data( 22 ) | |
|   } else if( vpcc_unit_type = = VPCC_OVD \|\| vpcc_unit_type = = VPCC_PDG ) | |
| { | |
|     vpcc_reserved_zero_23bits | u(23) |
|   } else | |
|     vpcc_reserved_zero_27bits | u(27) |
| } | |

TABLE 3

| V-PCC unit payload syntax | |
|---|---|
| | Descriptor |
| vpcc_unit_payload( ) {<br>  if( vpcc_unit_type = = VPCC_SPS )<br>    sequence_parameter_set( )<br>  else if( vpcc_unit_type = = VPCC_PDG )<br>    patch_data_group( )<br>  else if( vpcc__unit_type = = VPCC_OVD \|\|<br>    vpcc_unit_type = = VPCC_GVD \|\| | |

TABLE 3-continued

V-PCC unit payload syntax

| | Descriptor |
|---|---|
| vpcc_unit_type = = VPCC_AVD)<br>video_data_unit( )<br>} | |

In examples (e.g., when lossless coding is used in V-PCC), an encoder may generate a patch of missed points that includes information on points that may be missing after reconstruction from a compressed V-PCC bitstream. The missing points may be referred to as missing pulse code modulation (PCM) points. The PCM points may be coded directly, for example, without utilizing a patch projection process. The patch of missed points may enable a decoder to reconstruct (e.g., fully reconstruct) the original point cloud that may be provided as input to the V-PCC encoder. A patch that includes information relevant to the missing points may be packed in the same video (e.g., in the same video stream that carries the other points) or in a separate video (e.g., in a separate video stream from one carrying the other points).

A patch data group (PDG) may be replaced with patch NAL (PNAL) units (e.g., or atlas NAL units). PNAL units may be equivalent to the network abstraction layer (NAL) units used for video streams. Each PNAL unit may include a header that includes a unit type and/or additional information (e.g., such as layer identification). The PNAL units may be defined in one or more formats. The one or more formats may include a simple PNAL unit stream format and/or a sample stream format. In a sample stream format, an additional header may precede the PNAL unit. The additional header may indicate a size (e.g., an exact size) of the PNAL unit.

An International Organization for Standardization (ISO) Base Media File Format (ISOBMFF) may define a structural, media-independent file format. An ISOBMFF (e.g., an ISOBMFF container file) may include structural and/or media data information, for example, for timed presentations of media contents such as audio, video, etc. An ISOBMFF container file may include support for un-timed data, such as meta-data at different levels within the file structure. The logical structure of the file may be of (e.g., may mimic) a movie that may include a set of time-parallel tracks. The time structure of the file is that the tracks may include sequences of samples in time. The sequences may be mapped into the timeline of the overall movie. ISOBMFF may be based on the concept of box-structured files. A box-structured file may include a series of boxes (e.g., atoms), which may have respective sizes and/or types (e.g., each box may be associated with a size and a type). The types may be 32-bit values and may be represented by four printable characters, also known as a four-character code (4CC). Un-timed data may be included in a metadata box, e.g., at the file level, and/or may be attached to the movie box or one of the streams of timed data (e.g., tracks), within the movie.

An ISOBMFF container (e.g., an ISOBMFF container file) may include a MovieBox ('moov'). The MovieBox may include metadata for the media streams (e.g., continuous media streams) present in the file. The metadata may be signaled within the hierarchy of boxes in the Movie box, e.g., within the TrackBox ('trak'). A track may represent a medial stream (e.g., a continuous media stream) that is present in the file. The media stream may include a sequence of samples (e.g., sample entries), such as audio or video access units of an elementary media stream, and may be enclosed within a MediaDataBox ('mdat') (e.g., which may be present at the top-level of the container). The metadata for each track may include a list of sample description entries, each providing the coding or encapsulation format used in the track and the initialization data for processing that format. Each sample may be associated with one of the sample description entries of the track. A tool may be used to define an explicit timeline map for each track. For example, an edit list may define the explicit timeline map for each track. The edit list may be signalled using an EditList-Box (or a similar entity) with the example syntax shown in Table 4, where each entry defines part of the track time-line, e.g., by mapping part of the composition timeline, or by indicating an 'empty' time or 'empty' edit (e.g., portions of the presentation timeline that map to no media).

TABLE 4

Example EditListBox Syntax

```
aligned(8) class EditListBox extends FullBox('elst', version, flags)
{
    unsigned int(32) entry_count;
    for (i=1; i <= entry_count; i++) {
        if (version==1) {
            unsigned int(64) edit_duration;
            int(64) media_time;
        } else { // version==0
            unsigned int(32) edit_duration;
            int(32)   media_time;
        }
        int(16) media_rate_integer;
        int(16) media_rate_fraction = 0;
    }
}
```

ISOBMFF may be used to handle situations where a file author (e.g., an encoding device) may indicate certain actions to be performed on a player or renderer. In the case of video streams, the file author may indicate such actions through the use of restricted video scheme tracks. When a video track is a restricted video scheme track (e.g., as defined in subclause 8.15 of the ISO/IEC 14496-12 standard), post-decoder requirements may be signaled on the track. A track may be transformed into a restricted video scheme track by setting its sample entry code to the four-character code (4CC) 'resv' and adding a RestrictedSchemeInfoBox (or a similar entity) to its sample description. One or more (e.g., all other) boxes may be left unmodified. The original sample entry type, which is based on the video codec used for encoding the stream, may be stored within an OriginalFormatBox (or a similar entity) within the RestrictedSchemeInfoBox. The RestrictedSchemeInfoBox may include three boxes: OriginalFormatBox, SchemeTypeBox, and SchemeInformationBox. The OriginalFormatBox may store the original sample entry type, which is based on the video codec used for encoding the component stream. The nature (e.g., characteristics) of the restriction may be defined in the SchemeTypeBox.

Figure 3:
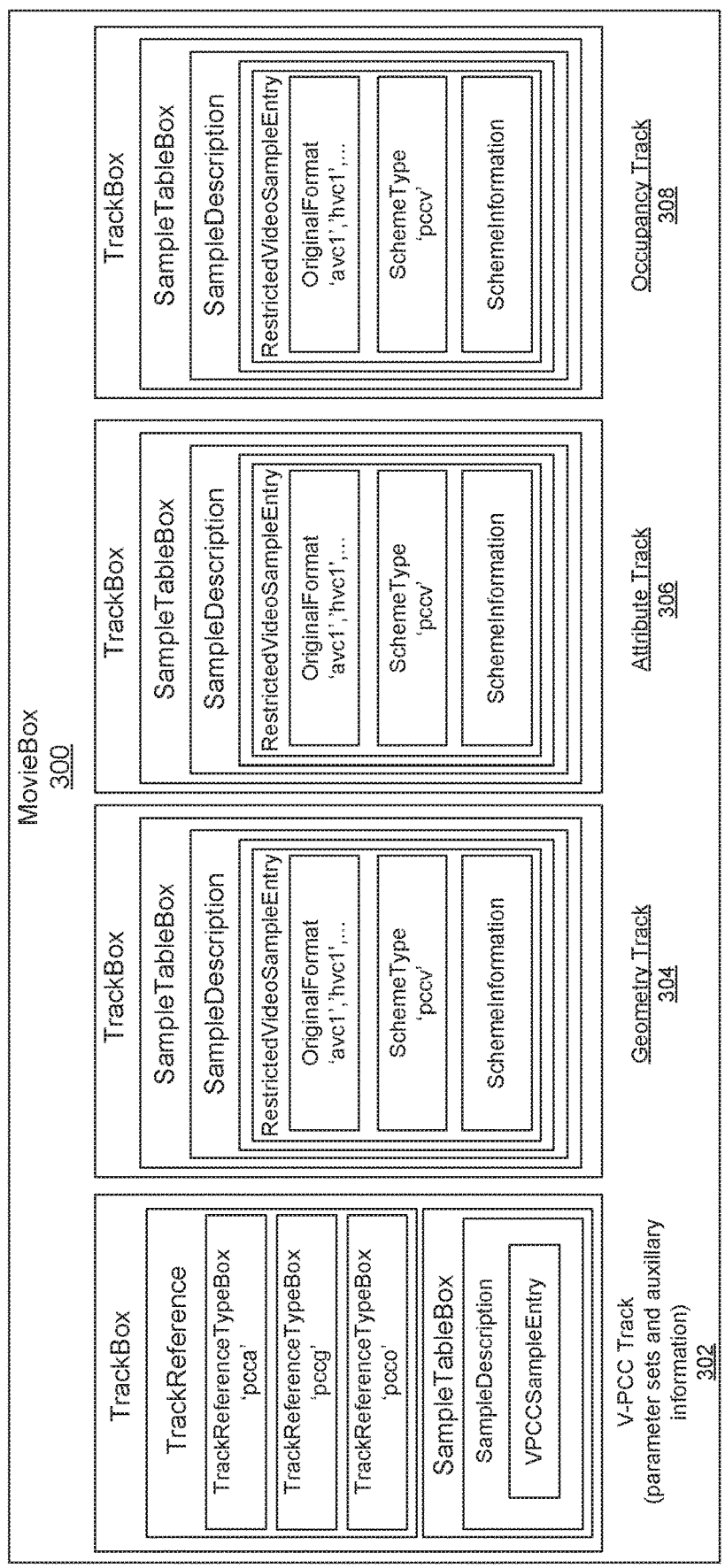
FIG. 3 illustrates an example media container structure.

FIG. 3 illustrates an example structure of an ISOBMFF V-PCC container 300. Based on this example structure, a V-PCC ISOBMFF container may include one or more the following. A V-PCC ISOBMFF container may include a V-PCC track 302. The V-PCC track 302 may include one or more sequence parameter sets and/or samples carrying the payloads of one or more non-video-encoded information V-PCC units (e.g., V-PCC unit types of VPCC_SPS and/or VPCC_PDG). The V-PCC track 302 may provide track references to other tracks that contain samples carrying the payloads of one or more video-compressed V-PCC units (e.g., V-PCC unit types of VPCC_GVD, VPCC_AVD, and/or VPCC_OVD). A V-PCC ISOBMFF container may include one or more restricted video scheme tracks 304 the samples of which may include NAL units for video-coded elementary streams for geometry data (e.g., payloads of V-PCC units of type VPCC_GVD). A V-PCC ISOBMFF container may include one or more restricted video scheme tracks 306 the samples of which may include NAL units for video-coded elementary streams for attribute data (e.g., payloads of V-PCC units of type VPCC_AVD). A V-PCC ISOBMFF container may include one or more restricted video scheme tracks 308 the samples of which may include NAL units for a video-coded elementary stream for occupancy map data (e.g., payloads of V-PCC units of type VPCC_OVD).

A container format for point cloud data may be provided. Carriage of missing PCM points information may be supported by the container format for point cloud data. Signaling of V-PCC file groups and/or spatial access may be provided. A sample format for a V-PCC track may support PNAL units. A number of file format structures may be provided to support PCM information and/or provide signaling that enables flexible access to different components, layers, and/or spatial regions within the V-PCC bitstream, A track (e.g., only a single track) may be used to store information for the layers (e.g., all the layers) of a V-PCC component, for example, when the layers of the V-PCC component constitute a single video stream. A sample grouping mechanism may be used to group samples belonging to each layer.

If the layers are stored in separate tracks, a track grouping tool may be used to signal that the separate tracks are for layers that belong to the same V-PCC component. For example, a track group type (e.g., a VPCCComponentGroupBox or a similar entity) may be defined, e.g., by extending TrackGroupTypeBox. TrackGroupTypeBox may include a track_group_id field, which is an identifier for the group, and a track_group_type field, which stores a four-character code identifying the group type. The pair of track_group_id and track_group_type may identify a track group within the container file. The VPCCComponentGroupBox may be defined as follows. The VPCCComponentGroupBox may be a box type of 'vplg' and may be located within a TrackGroupBox container. In examples, the VPCCComponentGroupBox may be optional (e.g., not mandatory). In examples, there may be multiple VPCCComponentGroupBox boxes in a TrackGroupBox.

Table 5 illustrates an example VPCCComponentGroupBox syntax.

TABLE 5

Example VPCCComponentGroupBox Syntax aligned(8) class VPCCComponentGroupBox extends
TrackGroupTypeBox('vpcg') {
    // additional data related to the V-PCC component can be defined
    here
}

Tracks (e.g., all tracks) belonging to layers of the same component may have a VPCCComponentGroupBox within the TrackGroupBox. In each VPCCComponentGroupBox, the value of track_group_id may be the same. A V-PCC media player may identify tracks belonging to the same V-PCC component by parsing each track in the container and/or identifying those having VPCCComponentGroupBoxes with the same track_group_id value.

To collectively reference tracks (e.g., all tracks) belonging to the same component, the track reference corresponding to the V-PCC component in the main V-PCC track may use the track_group_id for the component's track group (e.g., to identify the one or more tracking groups associated with the component). For example, the TrackReferenceTypeBox corresponding to the component may have an entry in its track_IDs array that uses the track_group_id to identify the component's track group.

In examples, TrackGroupTypeBox may include a flag field and a bit (e.g., bit 0 of the field, with bit 0 being the least significant bit) may be used to indicate the uniqueness of track_group_id. Tracks that carry geometry and/or attribute information for the same layer may be grouped. Grouping tracks that carry geometry and/or attribute information may enable a media player to perform scalable access to the V-PCC content. A VPCCLayerGroupBox or a similar entity may be defined and may be given a box type of 'vplg' The VPCCLayerGroupBox may be located within a TrackGroupBox container. In examples, the VPCCLayerGroupBox may be optional (e.g., not mandatory). In examples, there may be multiple VPCCLayerGroupBox boxes in a TrackGroupBox.

Table 6 illustrates an example VPCCLayerGroupBox syntax.

TABLE 6

Example VPCCLayerGroupBox Syntax aligned(8) class VPCCLayerGroupBox extends
TrackGroupTypeBox('vplg')
{
    unsigned int(4) layer_index;
    bit(3) reserved = 0;
    bit(1) absolute_coding_flag;
    if (!absolute_coding_flag)
        unsigned int(4) predictor_layer_index;
    bit(4) reserved = 0;
    // additional data related to the V-PCC layer can be
    defined here
}

As shown in the example syntax, the VPCCLayerGroupBox field may include one or more of the following fields. The layer_index field may indicate the index of a layer to which the one or more tracks of the group belong. The absolute_coding_flag field may indicate whether the geometry track in this track group depends on a geometry track in another layer. If absolute_coding_flag is set to 1, the track may not depend on another layer. If absolute_coding_flag is set to 0, the track may depend on another layer. The predictor_layer_index field may indicate the index of the layer which the geometry track in this group depends on.

A V-PCC component track may be provided. In examples (e.g., when one or more V-PCC stream components such as occupancy, geometry, and/or attribute components are video-coded), one or more tracks carrying information pertaining to a V-PCC stream component (e.g., any of the occupancy, geometry, and/or attribute components) may be signaled as restricted video scheme tracks. A restricted video scheme track may not be meant for direct rendering. The scheme_type field in the SchemeTypeBox may be set to a 4CC for the components of V-PCC content (e.g., 'pccv'). Data associated with the V-PCC scheme may be stored in the SchemeInformationBox. For example, the data associated with the V-PCC scheme may be signalled in VPCCComponentInfoBox (or a similar entity), which may be carried in the SchemeInformationBox and defined as follows.

Table 7 illustrates an example VPCCComponentInfoBox syntax.

TABLE 7

Example VPCCComponentInfoBox Syntax

```
aligned(8) class VPCCComponentInfoBox extends FullBox('vpco',0,0)
{
    unsigned int(2) component_type;
    if ((component_type == 2) || (component_type == 3)) {
        bit(1) is_pcm_flag;
        if (is_pcm_flag) {
            bit(5) reserved = 0;
        } else {
            bit(1) all_layers_present_flag;
            if (all_layers_present_flag) {
                bit(4) reserved = 0;
            } else {
                unsigned int(4) layer_index;
            }
        }
    } else {
        bit(6) reserved = 0;
    }
}
```

As shown in the example semantics, VPCCComponentInfoBox may include one or more of the following fields. The component_type field may indicate the type of the component. For example, a value of 0 for the component_type may be reserved. A value of 1 for the component_type may indicate an occupancy map component. A value of 2 for the component_type may indicate a geometry component. A value of 3 for the component_type may indicate an attribute component. It should be noted that the numbers are provided herein as examples and other numbers may be used to indicate various component types. The is_pcm_flag field may indicate whether the information carried in the track is for PCM points. When is_pcm_flag is set (e.g., to a value of 1), the track may carry PCM information for the component indicated by component_type. The all_layers_present_flag field may indicate whether the track is carrying information for all the layers of the component. Coded data for the layers (e.g., all the layers) of the component may be present in the track, for example, when all_layers_present_flag is set (e.g., to a value of 1). Otherwise (e.g., when all_layers_present_flag is not set or set to a value of 0), the track may carry coded data for a single layer of the component. The layer_index field may indicate the index of the component layer to which the data carried by the track belong.

The SchemeInformationBox may include an additional VPCCAttributeInfoBox (or a similar entity), which may provide additional description of the attribute component, for example, if the component track is carrying attribute information (e.g., component_type is set to 3). The VPCCAttributeInfoBox may be defined as shown in Table 8.

TABLE 8

Example VPCCAttributeInfoBox Syntax

```
aligned(8) class VPCCAttributeInfoBox extends FullBox('vpai',0,0)
{
    unsigned int(16) attr_index;
    unsigned int(4) attr_type;
    bit(4) reserved = 0;
    unsigned int(8) attr_dimensions;
```

TABLE 8-continued

Example VPCCAttributeInfoBox Syntax

```
    if (attr_dimensions > 3) {
        unsigned int(8) attr_first_dim_index;
    }
}
```

As shown in the example semantics of Table 8, the VPCCAttributeInfoBox may include one or more of the following fields. The attr_index field may indicate the index of the attribute in the list of attributes. The attr_type field may indicate an attribute type of the attribute. The attr_dimensions field may indicate a number of (e.g., the total number of) dimensions for the attribute. The attr_first_dim_index field may indicate the index (e.g., a zero-based index) of the first attribute dimension carried by the track.

The VPCCAttributeInfoBox may include a partition index. Table 9 illustrates another example VPCCAttributeInfoBox Syntax.

TABLE 9

Example VPCCAttributeInfoBox Syntax

```
aligned(8) class VPCCAttributeInfoBox extends FullBox('vpai',0,0) {
    unsigned int(16) attr_index;
    unsigned int(4) attr_type;
    bit(4) reserved = 0;
    unsigned int(8) attr_dimensions;
    unsigned int(7) attr_dim_partition_index;
    bit(1) reserved = 0;
}
```

As shown in the example syntax of Table 9, the VPCCAttributeInfoBox may include one or more of the following fields. The attr_index field may indicate the index of the attribute in the list of attributes. The attr_type field may indicate the type of the attribute. The attr_dimensions field may indicate a number of (e.g., the total number of) dimensions for the attribute. The attr_dim_partition_index field may represent the index (e.g., zero-based) of the dimension partition carried by the track.

In examples, a VPCCComponentBox may carry (e.g., directly carry) the vpoc_unit_header( ) HLS struct for the vpcc_unit_type corresponding to the component information carried by the track. If vpcc_unit_type is VPCC_AVD, the presence of VPCCAttributeInfoBox in SchemeInformationBox may be optional.

Information on missing PCM points may include geometry data and/or attribute data. PCM point information may be packed in the video stream of a relevant component and/or available as separate video streams (e.g., one video stream for each component). The PCM point information may be carried in separate tracks (e.g., one track for information related to a certain component), for example, when PCM point information is available separately. The separate tracks may be signaled as restricted video scheme tracks (e.g., as described herein) with the is_pcm_flag field in the VPCCComponentBox set to 1. Each track carrying PCM points information may be included in the track group of the relevant component. A track reference from the main track to the track_group_id of a V-PCC component may reference (e.g., collectively reference) tracks for PCM and/or non-PCM points. Geometry information and attribute information associated with PCM may be grouped, for example, to enable easy identification and access to missing points. Track grouping may be defined using a VPCCPCMTrackGroupBox (or a similar entity) as shown in Table 10, for example, to identify tracks with PCM points information.

TABLE 10

Example VPCCPCMTrackGroupBox Syntax

```
aligned(8) class VPCCPCMTrackGroupBox extends
TrackGroupTypeBox('vpcm') {
    // additional data related to the PCM points can be defined here
}
```

Tracks carrying information related to PCM points of a certain V-PCC content may include a VPCCPCMTrackGroupBox (or a similar entity) within the TrackGroupBox. In each VPCCPCMTrackGroupBox, the value of track_group_id may be the same.

A 4CC value (e.g., 'pcop') may be defined for the reference_type field of the TrackReferenceTypeBox. The 4CC value may be used to signal references to tracks carrying PCM points data (e.g., including geometry and/or attribute data).

In examples, there may be no constraint on the prediction structure used for encoding the various components of a V-PCC bitstream. As such, it may be possible to encode different components and/or different layers of the same component (e.g., if the components are not in the same video stream) with an encoding configuration that would result in non-aligned intra-refresh periods across the various component sub-streams. Such non-aligned intra-refresh periods across the various component sub-streams may make random access challenging since an intra-coded sample in a patch stream in the main V-PCC track at a given decoding time may not have a corresponding intra-coded sample in other component tracks for the same decoding time. Without additional information indicating where the sync samples in the component tracks are relative to the main track, a media player may resort to scanning for the component tracks for the closest sync samples.

Sync samples in one V-PCC component may be misaligned with sync samples in other components. Sync samples in the main track may have corresponding sync samples in other (e.g., all other) component tracks. For example, if the intra-refresh period of a patch sequence stream is once every 30 frames, the geometry component may have an intra-refresh period of once every 60 frames and/or the texture attribute may have an intra-refresh period of once every 30 frames. For example, an intra-refresh frame may be present every 30 seconds in the main track and in the other (e.g., all other) components Intra-refresh frames may have the same decoding time.

Figure 4:
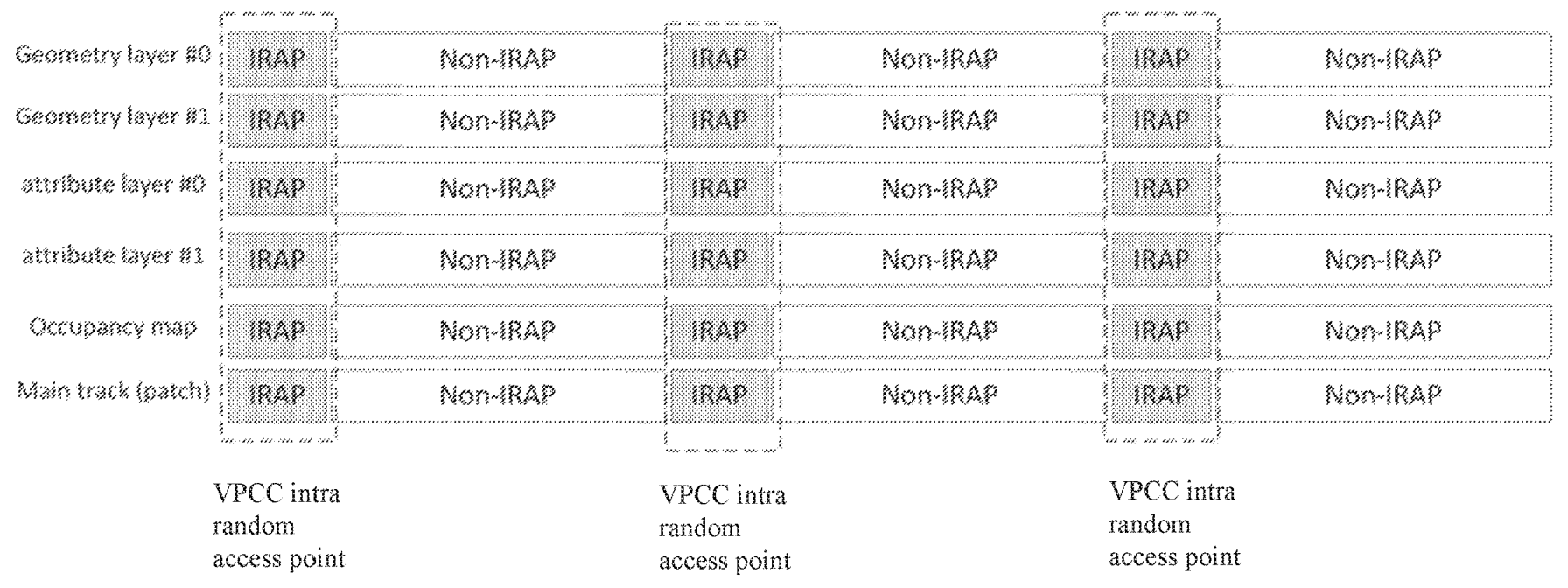

A constraint may be defined (e.g., to support random access) on the coding intra-random access point (IRAP) period across the components such that the IRAP samples are aligned across the tracks. For example, the encoder may be constrained in order to generate sub-streams that have aligned sync samples at regular intervals. With the constraint, the decoder and/or client may assume IRAP samples are available in one or more other (e.g., all other) components at the same time when an IRAP sample is detected in one (e.g., any) component track. The IRAP of each component may represent an IRAP for the VPCC bitstream. FIG. 4 illustrates an example of the constraint where the IRAP samples of the components are aligned.

The constraint described herein may eliminate the need for additional info to signal the correspondence of sync samples across the tracks. When a sync sample is reached in the main track, a corresponding sync sample with the same decoding time may be found in the other (e.g., all other) component tracks.

Figure 5:
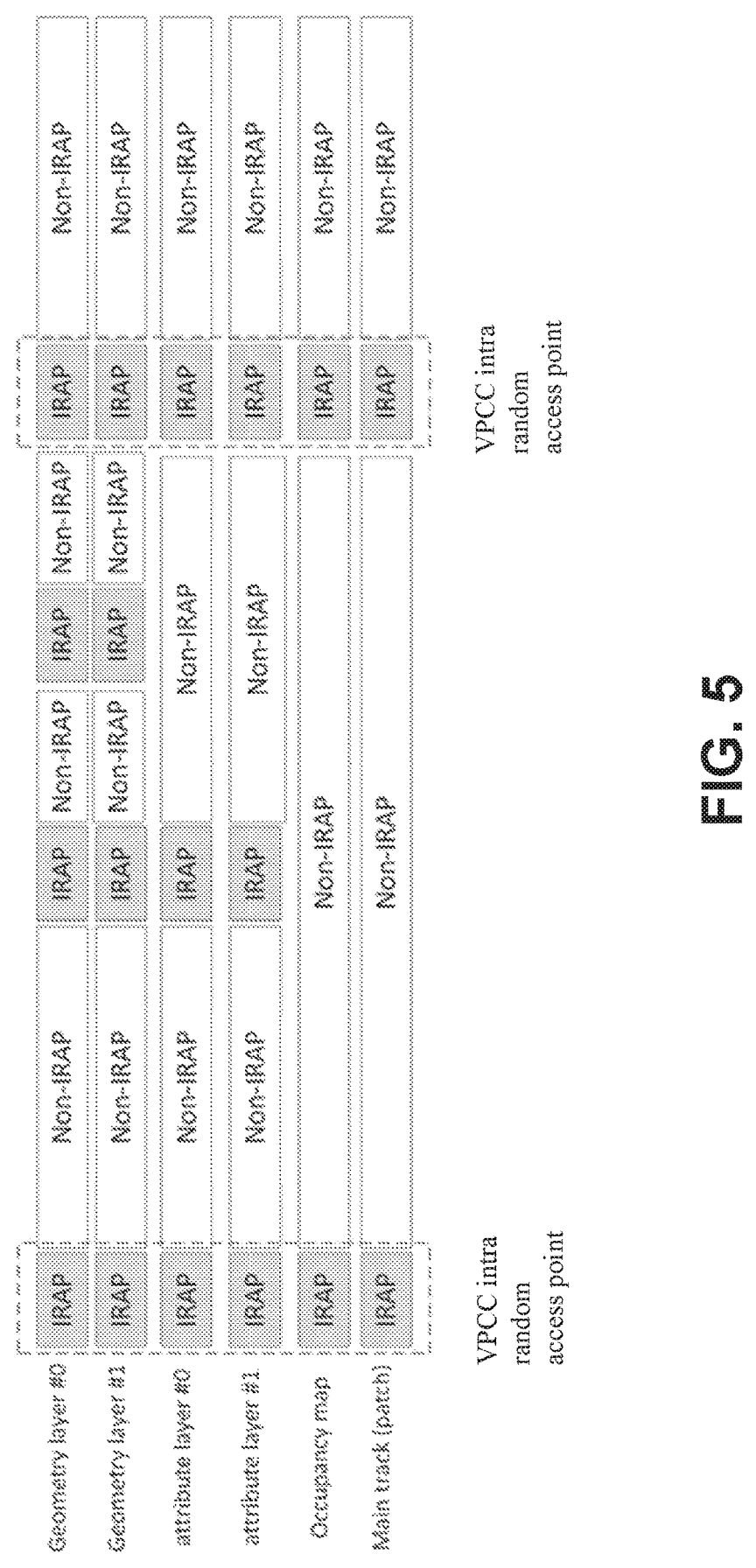

In examples, the IRAP period for the different components and the main patch sequence track may be chosen such that time aligned (e.g., synchronized) intra samples appear at a regular interval. When time aligned (e.g., synchronized) intra samples appear at a regular interval, a V-PCC media player accessing a sync sample in the main V-PCC track may find corresponding sync samples for the same decoding time in other component tracks. Each component may have a different IRAP period. The IRAP period of the main V-PCC track may be the least common multiple of the IRAP period of other (e.g., all) component tracks. The main V-PCC track's IRAP may represent the IRAP of the V-PCC bitstream. FIG. 5 illustrates an example of using a least common multiple of IRAP periods to indicate the V-PCC IRAP.

In examples, there may be no constraint on the IRAP period for the V-PCC components. The main V-PCC track's IRAP may represent the IRAP of the V-PCC bitstream. For other components, a closest IRAP may be located given the decoding and/or presentation time for the IRAP in the main V-PCC.

V-PCC high-level syntax (HLS) may support tile groups. In video coding standards (e.g., HEVC), a 2D frame may be divided into a grid of tiles. One or more tile groups may correspond to a rectangular region in the 2D frame that includes a number of tiles. A motion constrained tile set (MCTS) may be decoded (e.g., independently decoded) and may enable extraction of a specific region within the frame. In V-PCC, patches corresponding to points belonging to a certain region (e.g., a 3D region or a cuboid) of space may be packed in one or more MCTSs. Tile group and MCTS may be used interchangeably herein.

Figure 6:
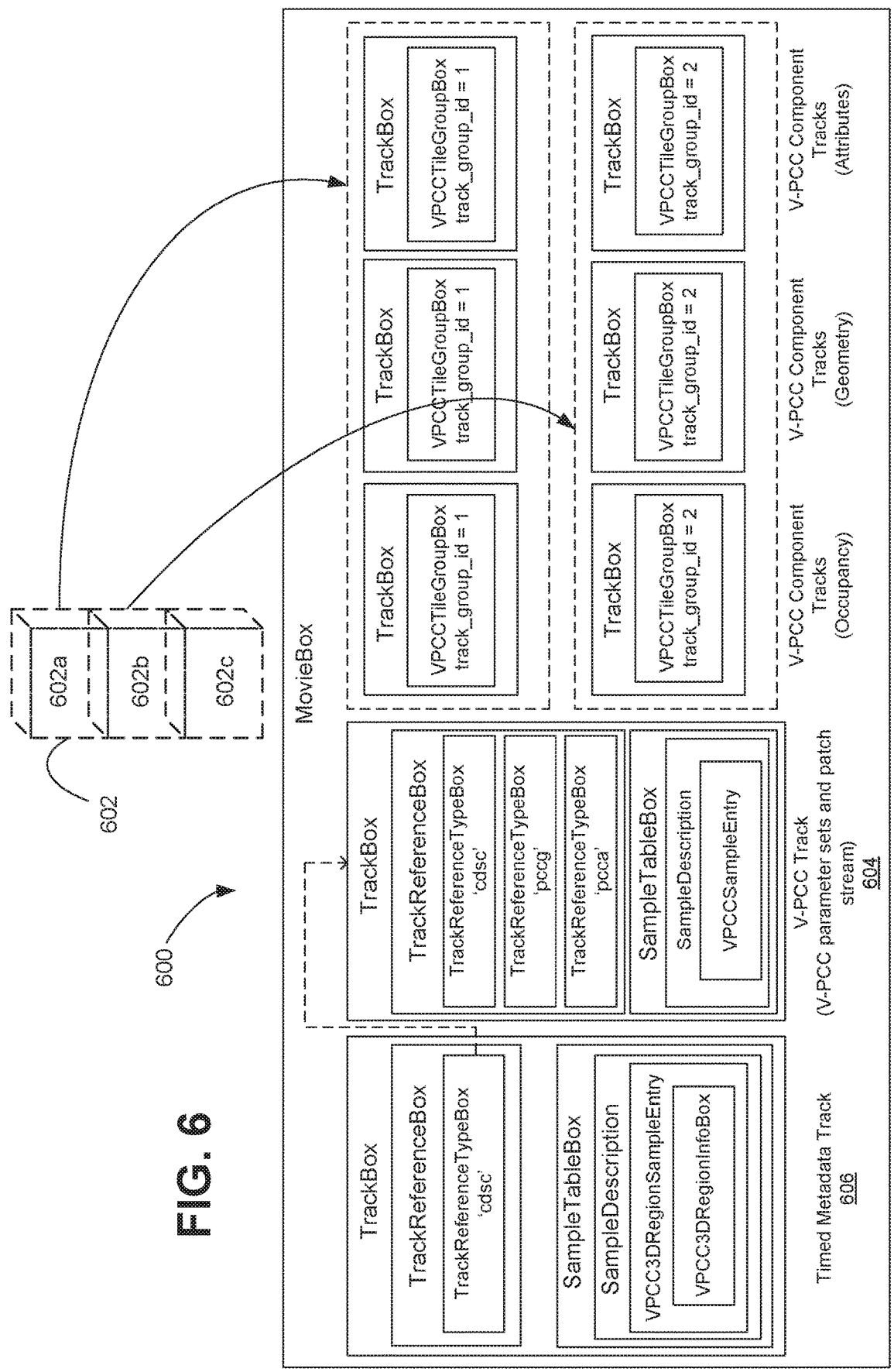
FIG. 6 illustrates an example media container structure that may be used to enable spatial access to specific regions within a 3D space.

FIG. 6 illustrates an example of a V-PCC container structure 600 that may be used to enable spatial access to specific regions within a 3D space. As shown, the 3D space 602 (e.g., a bounding box corresponding to the 3D space) for a point cloud may be divided into a 3D cube grid (e.g., cuboids 602a, 602b, 602c, etc.) representing a plurality of regions and/or objects in the 3D space. The points belonging to each of the regions and/or objects within the 3D space may be clustered and a bounding box may be used to represent that region or object. Points belonging to different parts of the same object may be grouped together and may be represented by a respective bounding box for that part.

Patches resulting from the projection of points within each of the resulting bounding boxes may be packed together in one or more tile groups within the 2D frames of a plurality of V-PCC component streams or tracks (e.g., occupancy, geometry, and/or attribute streams or tracks). The patches may be encoded using an encoding configuration that generates the tile groups (e.g., independently decodable tile groups). These tile groups may be carried in separate tracks within an ISOBMFF container and as such the term 'tile groups' may be used interchangeably herein with 'track groups' (e.g., a tile group may be an instance of a track group). Carrying tile groups in separate tracks may enable a decoding device (e.g., a media player) to access and/or download those tracks carrying information relevant to a specific region or object in the 3D space. For example, when tile groups are carried in separate tracks of a V-PCC bitstream, a media player may be able to only access and/or download the tracks relevant to a specific region of the 3D space when decoding the specific region (e.g., when rendering a visual representation of the region).

Tracks with corresponding tile groups across the V-PCC components (e.g., those carrying information for the points within a bounding box representing a region or object) may be grouped together using a track grouping tool. A TrackGroupBox ('trgr') or a similar entity may be added to the TrackBox of each of these tracks and a track grouping type for V-PCC tile groups may be defined by extending a TrackGroupTypeBox as illustrated below (e.g., utilizing a track_group_id or tile_group_id field).

Table 11 illustrates an example VPCCTileGroupBox Syntax.

TABLE 11

Example VPCCTileGroupBoxSyntax

```
aligned(8) class VPCCTileGroupBox extends
TrackGroupTypeBox('vptg')
{
    unsigned int(16) tile_group_id;
}
```

As shown in the example semantics of Table 11, VPCCTileGroupBox may include a tile_group_id field (or a similar field) identifying (e.g., as an identification for) the V-PCC tile group. In examples, the tile_group_id may correspond to (e.g., be identical to) a tile group address (e.g., a field such as ptgh_address, which may be included in a tile group header of the V-PCC bitstream). Tracks belonging to the same point cloud tile group may have the same value of track_group_id for track_group_type 'vptg'. The track_group_id of tracks from one point cloud tile group may differ from the track_group_id of tracks from any other point cloud tile group. For example, as shown in FIG. 6, a first tile group corresponding to 3D region 602a may have a track group ID of 1 and a second tile group corresponding to 3D region 602b may have a track group ID of 2. As such, the track_group_id within TrackGroupTypeBox with track_group_type equal to 'vptg' (or a similar 4CC value) may be used as the identifier of the point cloud tile group within the ISOBMFF container file.

Sample grouping may be used, for example, to signal which sample belongs to which V-PCC tile group. For instance, sample grouping may be used if, for one V-PCC component, information related to more than one V-PCC tile group is carried in a track (e.g., for a set of V-PCC tile groups, there is a set of sample groups within the track where each group of samples is associated with a respective V-PCC tile group). A sample group entry may be defined (e.g., as shown in Table 12 below), where the semantics (e.g., definition) of tile_group_id may be identical to those for the tile_group_id defined in the VPCCTileGroupBox as provided herein. The group type may be 'vpge' or a similar 4CC value. The container may be a SampleGroupDescriptionBox ('sgpd') or a similar entity. The VPCCTileGroupBox may not be mandatory (e.g., may be optional) and each track may have (e.g., be associated with) multiple VPCCTileGroupBox. Table 12 illustrates an example syntax for a VPCCTileGroupEntry.

TABLE 12

Example VPCCTileGroupEntry Syntax

```
aligned(8) class VPCCTileGroupEntry( ) extends
VisualSampleGroupEntry ('vpge') {
    unsigned int(16) tile_group_id;
}
```

In examples, sub-tracks carrying one or more V-PCC tile groups may be defined within the component tracks. The one or more V-PCC tile groups may be defined using the SubTrackSampleGroupBox (or a similar entity) and listing the VPCCTileGroupEntry instances (or similar entities) corresponding to the V-PCC tile groups carried in each sub-track in the corresponding SubTrackSampleGroupBox, e.g., by referring to their group_description_index. The one or more V-PCC tile groups may be defined by defining a V-PCC specific VPCCTileGroupSubTrackBox (e.g., as shown in Table 13). The box type may be set to 'vpst' or a similar 4CC value. The container may be SubTrackDefinitionBox ('strd') or a similar entity. The VPCCTileGroupSubTrackBox may not be mandatory (e.g., may be optional), and each track may have multiple VPCCTileGroupSubTrackBox.

TABLE 13

Example VPCCTileGroupSubTrackBox Syntax

```
aligned(8) class VPCCTileGroupSubTrackBox extends
FullBox('vpst', 0, 0) {
    unsigned int(16) item_count;
    for(i = 0; i< item_count; i++) {
        unsigned int(16) tile_group_id;
    }
}
```

The union (e.g., the collection) of tile_group_ids in VPCCTileGroupSubTrackBox may describe (e.g., collectively describe) the sub track defined by the box. The semantics of VPCCTileGroupSubTrackBox may include one or more of the following fields. An item_count field may represent a count of the number of tile groups listed in the VPCCTileGroupSubTrackBox. A tile_group_id field may represent an identifier for a V-PCC tile group that is contained in this sub-track. A tile_group_id field in the VPCCTileGroupSubTrackBox may match (e.g., correspond to) a tile_group_id defined in a VPCCTileGroupEntry.

A mapping may be provided between regions or objects (e.g., each of the 3D bounding boxes) in a 3D space and their respective tile group(s), for example, to enable a client (e.g., a media play or a decoding device) to identify which tracks to access/download to render a certain region (e.g., as represented by the bounding box) in the 3D space. It should be noted that while the location of a tile group within a 2D frame may not change, the location, and possibly the size (e.g., dimensions), of the bounding box (e.g., a region) within the 3D space may change over time, for example, due to the movement of an object represented by the points within the bounding box. A 3D region in the point cloud may be defined using the example 3D region structure illustrated in Table 14.

TABLE 14

Example 3DRegionStruct Syntax

```
aligned(8) class 3DRegionStruct(dimensions_included_flag) {
    unsigned int(16) region_id;
    unsigned int(16) region_x;
    unsigned int(16) region_y;
    unsigned int(16) region_z;
    if (dimensions_included_flag) {
        unsigned int(16) region_width;
        unsigned int(16) region_height;
        unsigned int(16) region_depth;
    }
}
```

As shown in the example semantics of Table 14, a 3DRegionStuct may include one or more of the following fields. A region_id field may represent a unique identifier for the 3D region. A region_x field may represent the x-coordinate of a reference point associated with the 3D region (e.g., a bounding box associated with the region). A region_y field may represent the y-ooordinate of the reference point. A region_z field may represent the z-coordinate of the reference point. A region_width field may indicate the length of the 3D region (e.g., the bounding box associated with the region) along the x-axis. A region_height field may indicate the length of the 3D region (e.g., the bounding box associated with the region) along the y-axis. A region_depth field may indicate the length of the 3D region (e.g., the bounding box associated with the region) along the z-axis. A dimensions_included_flag field may indicate whether the dimensions of the 3D region (e.g., the bounding box associated with the region) are signaled in the same instance of the struct. For example, if the dimensions_included_flag has a value of 0 it may indicate that the dimensions are not signaled and that the dimensions may have been previously signaled for the same region (e.g., a previous instance of a VPCC3DRegionStruct with the same region_id signaled the dimensions). If the dimensions_included_flag has a value of 1, it may indicate that the dimensions are signaled.

A 3D region or object in a point cloud may be associated with one or more point cloud tile groups (e.g., instances of track groups) using a VPCCRegionToTileGroupBox or a similar entity. Table 15 illustrates an example VPCCRegionToTileGroupBox syntax.

TABLE 15

Example VPCCRegionToTileGroupBox Syntax

```
aligned(8) class VPCCRegionToTileGroupBox extends
FullBox('vpcr',0,0) {
    unsigned int(16) num_regions;
    for (i = 0; i < num_regions; i++) {
        unsigned int(16) region_id;
        unsigned int(8) num_tile_groups;
        for (j=0; j<num_tile_groups; j++) {
            unsigned int(16) tile_group_id;
        }
    }
}
```

As shown in the example semantics of Table 15, the VPCCRegionToTileGroupBox may indicate a mapping relationship between a region (or object) in a 3D space and one more tile groups (e.g., track groups). The VPCCRegionToTileGroupBox may include one or more of the following fields. A num_regions field may indicate the number of 3D regions in a point cloud associated with the 3D space. A region_id field may identify (e.g., include an identifier for) a 3D region. A num_tile_groups field may indicate the number of V-PCC tile groups associated with a 3D region. A tile_group_id field may identify a V-PCC tile group. As such, the VPCCRegionToTileGroupBox may link one or more tile to a 3D region via at least the tile_group_id field and the region_id field.

The VPCCRegionToTileGroupBox may be signaled in a sample entry of the main V-PCC track 604 or in the sample entry of a separate timed metadata track 606 that is associated with the main V-PCC track, as shown in FIG. 6. The timed metadata track 606 (e.g., which may be separate from the main V-PCC track) may be comprised in the ISOBMFF container and may be used to update one or more properties (e.g., the position and/or dimensions) of a defined 3D region for the point cloud, for example, over time. This timed metadata track 606 may include a defined sample entry (e.g., a VPCC3DRegionSampleEntry) with a 4CC of 'vp3r' (or a similar 4CC value), and the defined sample entry may extend an MetadataSampleEntry or a similar entity as shown by the example syntax (e.g., for VPCC3DRegionInfoBox or a similar entity) in Table 16.

TABLE 16

Example VPCC3DRegionInfoBox Syntax

```
aligned(8) class VPCC3DRegionInfoBox extends FullBox('vp3i',0,0) {
    unsigned int(16) num_regions;
    for (i = 0; i < num_regions; i++) {
        3DRegionStruct(1);
    }
}
aligned(8) class VPCC3DRegionSampleEntry( ) extends
MetaDataSampleEntry('vp3r') {
    VPCC3DRegionInfoBox( );
}
```

As shown in the example semantics of Table 16, VPCC3DRegionInfoBox may include a num_regions field that indicates the total number of 3D regions in a 3D space. The timed metadata track 606 may be linked to the main V-PCC track 604, for example, using a 4CC of 'cdsc' (or a similar 4CC value) as a track reference. A (e.g., each) sample in this timed metadata track may specify a 3D region, e.g., using the example syntax shown in Table 17 below. The VPCC3DRegionSample structure (e.g., or a similar entity) may be extended in derived track formats.

TABLE 17

Example VPCC3DRegionSample Syntax

```
aligned(8) class VPCC3DRegionSample( ) {
    unsigned int(16) num_regions;
    for (i = 0; i < num_regions; i++) {
        3DRegionStruct(dimensions_included_flag);
    }
}
```

As shown in the example semantics of Table 17, the VPCC3DRegionSample may include a num_regions field that may indicate the number of 3D regions being signaled in the sample. The number of 3D regions signaled in the sample may or may not be equal to the total number of available regions. For example, the number of 3D regions signaled in the sample may indicate the 3D regions whose properties (e.g., position and/or dimensions) are being updated in the sample.

Patch information may be carried in a V-PCC track, A VPCCDecoderConfigurationReoord (or a similar entity) and sample format syntax for the V-PCC track may be formatted as follows, for example, to support carriage of a patch information sub-stream that is structured as a sequence of patch network abstraction layer (PNAL) units. The VPCCDecoderConfigurationRecord may provide configuration information to a decoder (e.g., at the beginning of a decoding process). The VPCCDecoderConfigurationRecord may include one or more parameter sets and/or one or more supplemental enhancement information (SEI) messages. The VPCCDecoderConfigurationRecord may include a lengthSizeMinusOne field. Example VPCCDecoderConfigurationRecord syntax may be shown in Table 18 below.

TABLE 18

Example VPCCDecoderConfigurationRecord Syntax

```
aligned(8) class VPCCDecoderConfigurationRecord {
    unsigned int(8) configurationVersion = 1;
    unsigned int(2) lengthSizeMinusOne;
    bit(6) reserved = '111111'b;
    unsigned int(8) numOfSetupUnits;
    for (i=0; i<numOfSetupUnits; i++) {
        vpcc_unit_payload( ) setupUnit;
    }
    // additional fields
}
```

As shown in the example semantics of Table 18, a VPCCDecoderConfigurationRecord may include a configurationVersion field that indicates a present version of the configuration record. In examples, incompatible changes to the decoder configuration record may be indicated by a change of configuration version number. A decoding device may be configured to not attempt to decode a configuration record or the stream(s) to which it applies if the configuration version number is unrecognized. The VPCCDecoderConfigurationRecord may include a lengthSizeMinusOne field and the value of lengthSizeMinusOne plus 1 may indicate a length (e.g., in bytes) of a PNALUnitLength field in a V-PCC sample (e.g., in the stream to which this configuration record applies). For example, a PNALUnitLength field length of one byte may be indicated with a lengthSizeMinusOne value of 0. The value of the lengthSizeMinusOne field may be 0, 1, or 3, which may correspond to a length (e.g., PNALUnitLength) encoded with 1, 2, or 4 bytes, respectively.

In examples, a decoder configuration record may include one or more setup unit arrays such as a first setup unit array for V-PCC parameter sets (e.g., Vsequence parameter sets and a second setup unit array for other setup units for the patch information sub-stream. Table 19 below illustrates an example of indicating the one or more setup unit arrays.

TABLE 19

Example VPCCDecoderConfigurationRecord Syntax

```
aligned(8) class VPCCDecoderConfigurationRecord {
    unsigned int(8) configurationVersion = 1;
    unsigned int(2) lengthSizeMinusOne;
    bit(1) reserved = 1;
    unsigned int(5) numOfSequenceParameterSets;
    for (i=0; i<numOfSequenceParameterSets; i++) {
        sequence_parameter_set( ) spsUnit;
    }
    unsigned int(8) numOfSetupUnitArrays;
    for (j=0; j<numOfSetupUnitArrays; j++) {
        bit(1) array_completeness;
        bit(1) reserved = 0;
        unsigned int(6) PNAL_unit_type;
        unsigned int(8) numPNALUnits;
        for (i==0; i<numPNALUnits; i++) {
            unsigned int(16) pnalUnitLength;
            bit(8*pnalUnitLength) pnalUnit;
        }
    }
    // additional fields
}
```

As shown in the example the semantics of Table 19, a VPCCDecoderConfigurationRecord (or a similar entity) may include one or more of the following fields. A configurationVersion field (or a similarly named field) may indicate a present version of the configuration record. In examples, incompatible changes to the decoder configuration record may be indicated by a change of configuration version number. A decoding device may be configured to not attempt to decode a configuration record or the stream(s) to which it applies if the configuration version number is unrecognized. A numOfSequenceParameterSets field (or a similarly named field) may indicate a number of V-PCC parameter sets (e.g., arrays) signed (e.g., defined) in the decoder configuration record (e.g., for the stream(s) to which the decoder configuration record applies). A numOfSetupUnitArrays field may indicate a number of arrays of PNAL units of an indicated type (e.g., as indicated by PNAL_unit_type) signaled (e.g., defined) in the decoder configuration record (e.g., for the stream(s) to which the decoder configuration record applies). An array_completeness field may indicate whether all PNAL units are included in an array. For example, when the array_completeness field is equal to 1, it may indicate that PNAL units (e.g., all PNAL units) of the given type are included in the following array (e.g., none are in the stream). When the array_completeness field is equal to 0, it may indicate that additional PNAL units of the indicated type may be in the stream. The default and/or permitted values for array_completeness may be constrained by the sample entry name or sample entry type of a corresponding sample entry. For example, the VPCCDecoderConfigurationRecord may be used in different sample entries. The container for the VPCCDecoderConfigurationRecord may be a VPCCDecoderConfigurationBox (or a similar entity), which may be a box contained within a VPCCSampleEntry. The VPCCSampleEntry may be of different types and the type of the sample entry may set constraints on the permitted and/or default values for the array_completeness field in the enclosed VPCCDecoderConfigurationRecord.

The VPCCDecoderConfigurationRecord (or a similar entity) may include a PNAL_unit_type field that indicates a type of the PNAL units in the following array (e.g., all of PNAL units in the array may be of the indicated type). The PNAL_unit_type field may have (e.g., be restricted to take) one of the following values indicating a PUP_PSPS, a PUP_PREFIX_SEI, or a PUP_SUFFIX_SEI PNAL unit. The VPCCDecoderConfigurationRecord (or a similar entity) may include a numPNALUnits field that indicates a number of PNAL units of the indicated type included in the configuration record (e.g., for the stream(s) to which this configuration record applies). A supplemental enhancement information (SEI) array may include (e.g., only include) declarative SEI messages. Declarative SEI messages may include SEI messages that indicate information about the stream as a whole. For example, a user-data SEI may be a declarative SEI message.

The VPCCDecoderConfigurationRecord (or a similar entity) may include a pnalUnitLength field that indicates a length (e.g., in bytes) of a PNAL unit. The VPCCDecoderConfigurationRecord (or a similar entity) may include a pnalUnit field that may be used to hold a PUP_PSPS or a declarative SEI PNAL unit.

Based on the example VPCCDecoderConfigurationRecord syntax shown herein, a sample format for samples (e.g., represented as a VPCCSample) in a V-PCC track may be illustrated in Table 20 below.

TABLE 20

Example VPCCSample Syntax

```
aligned(8) class VPCCSample {
    unsigned int PointCloudPictureLength = sample_size; // size of
sample (e.g., from SampleSizeBox)
```

TABLE 20-continued

Example VPCCSample Syntax

```
  for (i=0; i<PointCloudPictureLength; )
  {
    unsigned
int((VPCCDecoderConfigurationRecord.lengthSizeMinusOne+1)*8)
PNALUnitLength;
    bit(PNALUnitLength * 8) PNALUnit;
    i += (VPCCDecoderConfigurationRecord.lengthSizeMinusOne+1) +
PNALUnitLength;
  }
}
```

As shown in the example semantics of Table 20, the VPCCDecoderConfigurationRecord field may indicate a decoder configuration record in the corresponding V-PCC sample entry. A PNALUnitLength field may indicate a size of a PNAL unit (e.g., measured in bytes). In examples, the PNALUnitLength field may include the size of both the PNAL unit header and the PNAL unit payload. In examples, the PNALUnitLength field may not include the size of the PNALUnitLength field itself. Further, a PNALUnit field may be included to represent a PNAL unit (e.g., a single atlas NAL unit).

In examples, patch information in the samples of the V-PCC track may be formatted based on a patch information sample stream (e.g., an atlas sample stream). The VPCC-DecoderConfigurationRecord (or a similar entity) may include a lengthSizeMinusOne field. Table 21 illustrates another example VPCCDecoderConfigurationRecord syntax.

TABLE 21

Example VPCCDecoderConfigurationRecord Syntax

```
  aligned(8) class VPCCDecoderConfigurationRecord {
    unsigned int(8) configurationVersion = 1;
    unsigned int(3) lengthSizeMinusOne;
    unsigned int(5) numOfSequenceParameterSets;
    for (i=0; i<numOfSequenceParameterSets; i++) {
      sequence_parameter_set( ) spsUnit;
    }
    unsigned int(8) numOfSetupUnitArrays;
    for (j=0; j<numOfSetupUnitArrays; j++) {
      bit(1) array_completeness;
      bit(1) reserved = 0;
      unsigned int(6) PNAL_unit_type;
      unsigned int(8) numPNALUnits;
      for (i=0; i<numPNALUnits; i++) {
        unsigned int(16) pnalUnitLength;
        bit(8*pnalUnitLength) pnalUnit;
      }
    }
    // additional fields
  }
```

The fields (e.g., variables) in the example syntax of Table 21 may be similar defined as those in Table 19. For example, the value of lengthSizeMinusOne plus 1 may indicate a length (e.g., in bytes) of a PNALUnitLength field (e.g., in a V-PCC sample in the stream to which this configuration record applies). So a size of one byte for the PNALUnitLength field may be indicated by the lengthSizeMinusOne field having a value of 0. In the example syntax of Table 21, the lengthSizeMinusOne field may be defined as an unsigned int(3) and as such, the value of the lengthSizeMinusOne field may range from 0 to 7.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A video decoding device configured to process video data associated with a three-dimensional (3D) space, the video decoding device comprising:
 a processor configured to:
 receive a media container file;
 parse the media container file to determine a 3D region associated with the 3D space and a set of tiles associated with the 3D space;
 determine, based on a first mapping indicated by the media container file, that the set of tiles is associated with the 3D region;
 determine, based on a second mapping indicated by the media container file, that the set of tiles is associated with a video component track group in which respective tracks carrying attribute, occupancy and geometry information for the set of tiles are clustered; and
 render a visual representation of the 3D region of the 3D space based on the tracks clustered in the video component track group.

2. The video decoding device of claim 1, wherein the media container file includes one or more syntax elements that indicate the first mapping.

3. The video decoding device of claim 1, wherein the media container file comprises one or more syntax elements that indicate a number of tiles associated with the 3D region.

4. The video decoding device of claim 1, wherein the media container file comprises timed metadata indicating an update to at least one property of the 3D region.

5. The video decoding device of claim 4, wherein the processor is configured to determine that set of tiles is associated with the 3D region based on the timed metadata.

6. The video decoding device of claim 4, wherein the 3D space comprises a plurality of regions and the timed metadata include information associated with a subset of the regions that have been updated.

7. The video decoding device of claim 1, wherein the tracks clustered in the video component track group share a common track group identifier and a common track group type.

8. The video decoding device of claim 1, wherein the one or more tiles are associated with a two-dimensional (2D) frame representative of the 3D space.

9. The video decoding device of claim 1, wherein the tracks clustered in the video component track group comprise one or more sample entries and each of the one or more sample entries comprises an indication of a length of a data field that indicates a network abstraction layer (NAL) unit size.

10. The video decoding device of claim 9, wherein each of the one or more sample entries further comprises an indication of a number of video-based point cloud compression (V-PCC) parameter sets associated with the sample entry or a number of arrays of atlas NAL units associated with the sample entry.

11. A method for decoding video data associated with a three-dimensional (3D) space, the method comprising:
receiving a media container file;
parsing the media container file to determine a 3D region associated with the 3D space and a set of tiles associated with the 3D space;
determining, based on a first mapping indicated by the media container file, that the set of tiles is associated with the 3D region;
determining, based on a second mapping indicated the media container file, that the set of tiles is associated with a video component track group in which respective tracks carrying attribute, occupancy and geometry information for the set of tiles are clustered; and
rendering a visual representation of the 3D region of the 3D space based on the tracks clustered in the video component track group.

12. The method claim 11, wherein the media container file includes one or more syntax elements that indicate the first mapping.

13. The method of claim 11, wherein the media container file comprises one or more syntax elements that indicate a number of tiles associated with the 3D region.

14. The method of claim 11, wherein the media container file comprises timed metadata indicating an update to at least one property of the 3D region.

15. The method of claim 14, wherein the 3D space comprises a plurality of regions and the timed metadata include information associated with a subset of the regions that have been updated.

16. The method of claim 11, wherein the tracks clustered in the video component track group share a common track group identifier and a common track group type.

17. The method of claim 11, wherein the tracks clustered in the video component track group comprise one or more sample entries and each of the one or more sample entries comprises an indication of a length of a data field that indicates a network abstraction layer (NAL) unit size.

18. The method of claim 17, wherein each of the one or more sample entries further comprises an indication of a number of video-based point cloud compression (V-PCC) parameter sets associated with the sample entry or a number of arrays of atlas NAL units associated with the sample entry.

19. A video encoding device configured to encode and transmit information associated with a three-dimensional (3D) space, the video encoding device comprising:
a processor configured to:
partition the 3D space into one or more 3D regions;
encode attribute, occupancy and geometry information associated with at least one of the one or more 3D regions into respective video-based point cloud compression (V-PCC) component tracks;
organize the respective V-PCC component tracks that carry the encoded attribute, occupancy and geometry information associated with the at least one of the one or more 3D regions into a V-PCC component track group;
indicate, in a media container file, a first mapping that associates the at least one of the one or more 3D regions with a set of tiles;
indicate, in the media container file, a second mapping that associates the set of tiles with the V-PCC component track group; and
transmit the media container file to a receiving device.

20. The video encoding device of claim 19, wherein the media container file further comprises timed metadata indicating an update associated with the one or more 3D regions.

* * * * *